(12) United States Patent
Yang

(10) Patent No.: US 7,608,933 B2
(45) Date of Patent: Oct. 27, 2009

(54) METHOD AND STRUCTURE FOR KINETIC ENERGY BASED GENERATOR FOR PORTABLE ELECTRONIC DEVICES

(75) Inventor: Xiao Yang, Cupertino, CA (US)

(73) Assignee: Xiao (Charles) Yang, Cupertino, CA (US)

( * ) Notice: Subject to any disclaimer, the term of this patent is extended or adjusted under 35 U.S.C. 154(b) by 164 days.

(21) Appl. No.: 11/555,101

(22) Filed: Oct. 31, 2006

(65) Prior Publication Data

US 2007/0102928 A1 May 10, 2007

Related U.S. Application Data

(60) Provisional application No. 60/732,349, filed on Oct. 31, 2005.

(51) Int. Cl.
*H02K 7/18* (2006.01)
*H02K 7/10* (2006.01)
*F02B 63/04* (2006.01)

(52) U.S. Cl. ...................... 290/1 C; 290/1 A
(58) Field of Classification Search ........... 290/1 A, 290/1 C
See application file for complete search history.

(56) References Cited

U.S. PATENT DOCUMENTS

| | | | | |
|---|---|---|---|---|
| 1,855,281 A * | 4/1932 | Chilton | ............... | 290/38 B |
| 2,877,755 A * | 3/1959 | Danilewicz | ............... | 123/179.22 |
| 3,573,479 A * | 4/1971 | Rieth | ............... | 290/1 E |
| 4,227,092 A * | 10/1980 | Campagnuolo et al. | ... | 290/1 C |
| 4,247,383 A * | 1/1981 | Greve et al. | ............... | 204/298.16 |
| 4,360,860 A * | 11/1982 | Johnson et al. | ............... | 362/192 |
| 4,701,835 A * | 10/1987 | Campagnuolo et al. | ... | 362/192 |
| 4,703,188 A * | 10/1987 | Gottfried | ............... | 290/38 B |
| 5,721,461 A * | 2/1998 | Taylor | ............... | 310/268 |
| 5,793,130 A * | 8/1998 | Anderson | ............... | 310/50 |
| 5,841,211 A * | 11/1998 | Boyes | ............... | 310/90 |
| 5,874,792 A * | 2/1999 | Chen et al. | ............... | 310/75 C |
| 5,880,532 A * | 3/1999 | Stopher | ............... | 290/1 E |
| 5,905,359 A * | 5/1999 | Jimena | ............... | 320/114 |
| 5,917,310 A * | 6/1999 | Baylis | ............... | 322/1 |
| 5,949,215 A * | 9/1999 | Takakura | ............... | 320/114 |
| 5,963,029 A * | 10/1999 | Pressesky | ............... | 324/212 |
| 6,034,492 A * | 3/2000 | Saito et al. | ............... | 318/141 |
| 6,133,642 A * | 10/2000 | Hutchinson | ............... | 290/1 A |
| 6,236,118 B1 * | 5/2001 | Vasija et al. | ............... | 290/1 E |
| 6,291,900 B1 * | 9/2001 | Tiemann et al. | ............ | 290/1 A |
| 6,534,887 B1 * | 3/2003 | Peczalski et al. | ......... | 310/90.5 |
| 6,849,960 B2 * | 2/2005 | Hartman et al. | ............ | 290/1 C |
| 6,930,403 B2 * | 8/2005 | Hartman et al. | ............ | 290/1 A |
| 6,943,459 B2 * | 9/2005 | Hartman et al. | ............ | 290/1 C |
| 7,009,350 B1 * | 3/2006 | Gold | ............... | 318/142 |
| 7,049,708 B2 * | 5/2006 | Hartman et al. | ............ | 290/1 A |

(Continued)

*Primary Examiner*—Nicholas Ponomarenko
*Assistant Examiner*—Pedro J Cuevas
(74) *Attorney, Agent, or Firm*—Townsend and Townsend and Crew LLP

(57) ABSTRACT

An asymmetric flywheel is coupled to an input gear that is attached to a lever or alike. The input gear and flywheel gear are engaged as the user rotates the lever. As a result, the flywheel spins and electricity is generated by the micro electromagnetic generator. When there is no direct user manual input, the input gear and the flywheel gear are disengaged. The flywheel is an unbalanced pivoted mass that rotates with inertial forces from physical accelerations by user's movement and gravitational forces, similar to a self-winding mechanism automatic watch. AC electricity is generated as a result of the flywheel's movement.

13 Claims, 5 Drawing Sheets

U.S. PATENT DOCUMENTS

| | | | |
|---|---|---|---|
| 7,205,732 B1 * | 4/2007 | Gold | 318/142 |
| 7,253,534 B2 * | 8/2007 | Vasilovich et al. | 290/1 R |
| 7,361,074 B1 * | 4/2008 | Periman et al. | 446/242 |
| 7,402,915 B2 * | 7/2008 | Hutchinson et al. | 290/1 A |
| 7,402,996 B2 * | 7/2008 | Arai et al. | 324/207.17 |
| 7,482,718 B2 * | 1/2009 | Terzian et al. | 310/37 |
| 7,485,992 B2 * | 2/2009 | Ekchian et al. | 310/37 |
| 2004/0130156 A1 * | 7/2004 | Hartman et al. | 290/1 A |
| 2005/0116472 A1 * | 6/2005 | Hartman et al. | 290/1 A |
| 2007/0052240 A1 * | 3/2007 | Hutchinson et al. | 290/1 C |
| 2007/0103009 A1 * | 5/2007 | Yang | 310/40 MM |
| 2007/0121249 A1 * | 5/2007 | Parker | 360/126 |
| 2007/0252586 A1 * | 11/2007 | Arai et al. | 324/207.13 |
| 2008/0238266 A1 * | 10/2008 | Moriyama et al. | 310/67 R |

\* cited by examiner

METHOD AND STRUCTURE FOR KINETIC ENERGY BASED GENERATOR FOR PORTABLE ELECTRONIC DEVICES

CROSS-REFERENCES TO RELATED APPLICATIONS

This application claims priority to provisional patent application Ser. No. 60/732,349; filed on Oct. 31, 2006; commonly assigned, and of which is hereby incorporated by reference for all purposes.

BACKGROUND OF THE INVENTION

Portable electronics devices such as cell phones become indispensable part of daily life. As more features such as music and video added to cell phones, power consumption increases significantly. Battery life becomes a bottleneck. Furthermore, dead batteries in cell phones cause inconvenience and have safety concerns in an emergency situation. Commercially available portable charging devices such as external batteries and stand-alone solar panel are bulky and cumbersome; therefore they have not been adopted widely by consumers. Thus, there is a need in the art for methods and apparatus for fabricating an integrated kinetic energy based generator for electricity generation for portable electronic devices.

SUMMARY OF THE INVENTION

The present invention relates to a method and device for fabricating an integrated kinetic energy based generator for portable electronic devices. The integrated generator device consists of a kinetic energy harnessing transducer mechanism and electricity conditioning unit. The kinetic energy harnessing mechanism consists of a flywheel device and a gear train that couples to the micro electromagnetic generator.

An asymmetric flywheel is coupled to an input gear that is attached to a lever or alike. The input gear and flywheel gear are engaged as the user rotates the lever. As a result, the flywheel spins and electricity is generated by the micro electromagnetic generator. When there is no direct user manual input, the input gear and the flywheel gear are disengaged. The flywheel is an unbalanced pivoted mass that rotates with inertial forces from physical accelerations by user's movement and gravitational forces, similar to a self-winding mechanism automatic watch. AC electricity is generated as a result of the flywheel's movement To minimize form factor, the integrated generator device is fabricated using IC and MEMS processes. The micro generator deploys planar electromagnetic components such as thin film magnetic film and planar coils. Permanent magnetic material is deposited using methods such as sputter, evaporation, Physical Vapor Deposition (PVD), pulsed laser deposition, etc. Planar coils are fabricated by deposition, electroplating, photo lithography and etch.

DETAILED DESCRIPTION OF THE INVENTION

Figure 1:
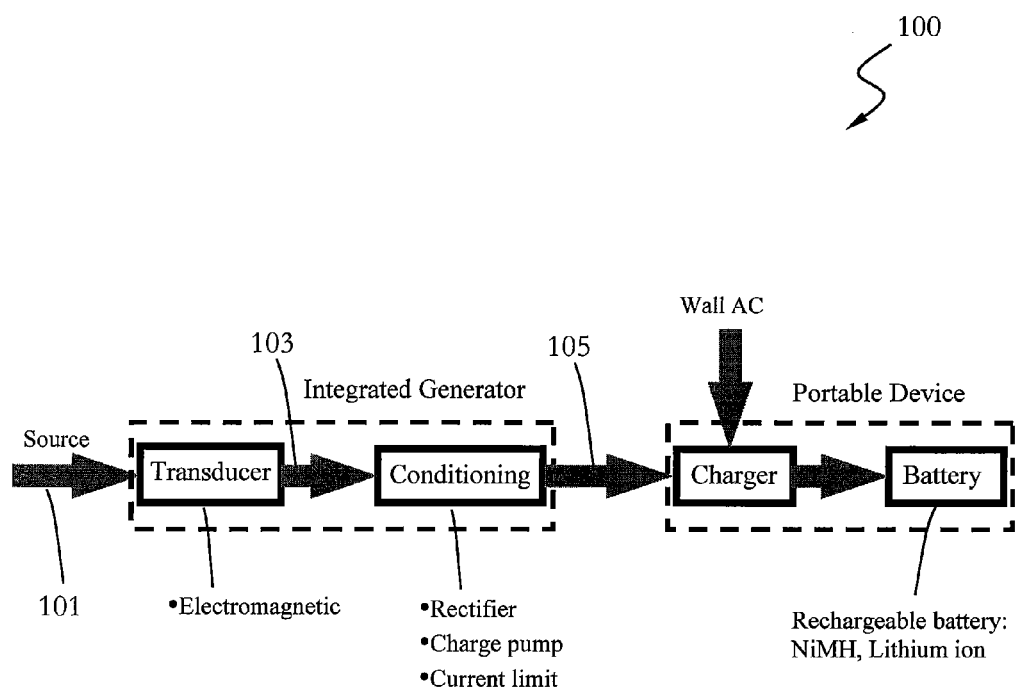
FIG. 1 is a simplified block diagram illustrating components of a power generation device for portable devices according to one embodiment of the present invention.

FIG. 1 is a simplified block diagram illustrating components of a power generation device for portable devices according to one embodiment of the present invention. As illustrated, a kinetic energy is a source 101 that is provided by direct user input or indirectly in forms such as user movements. The kinetic energy is converted to raw electricity 103 by a transducer by electromagnetic methods. The raw electricity is conditioned to a regulated voltage and current 105. The regulated electricity is stored in a re-chargeable battery via a charger device.

Figure 2:
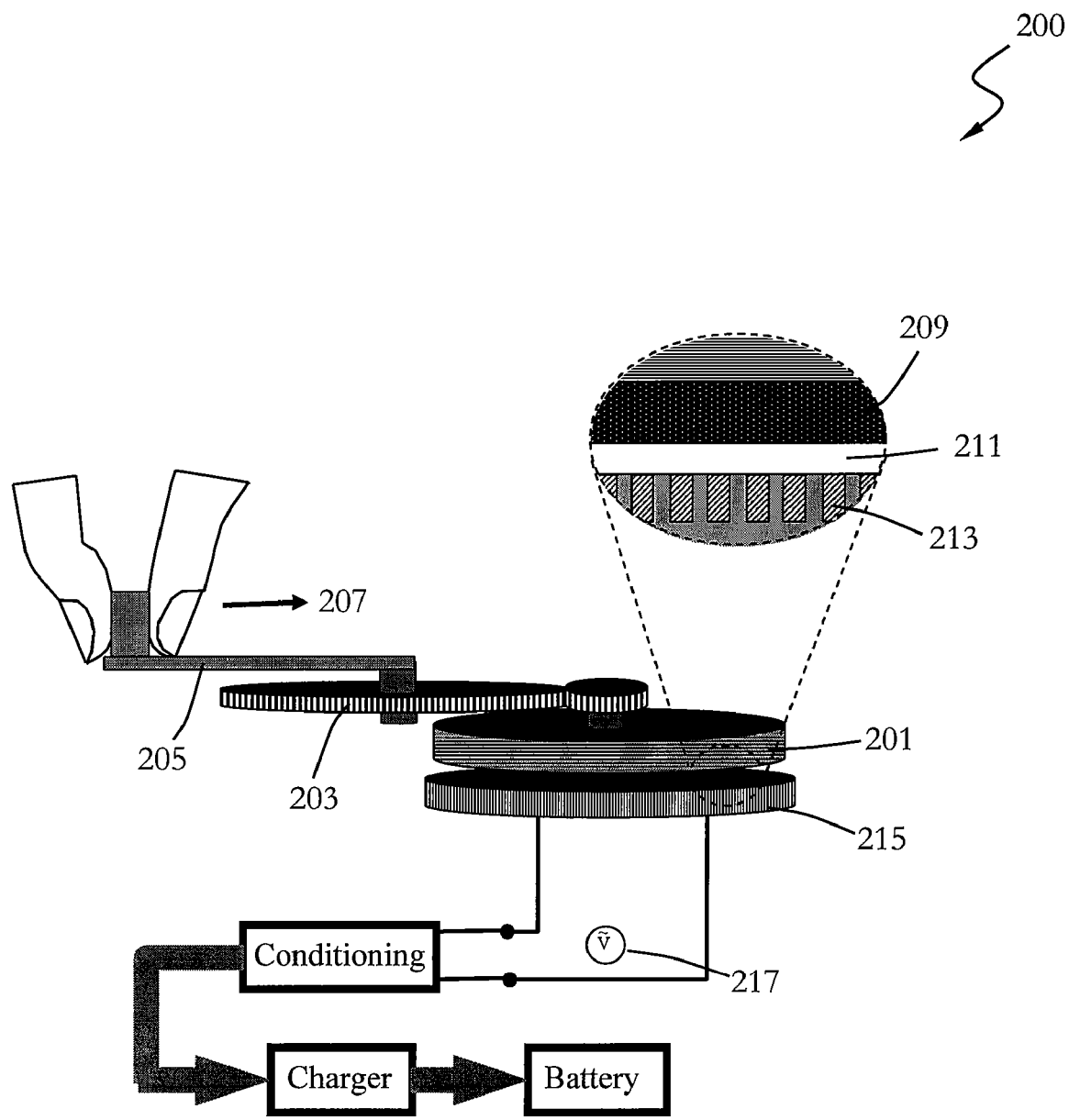
FIG. 2 is a simplified 3-D diagram illustrating components of an electricity generation device according to one embodiment of the present invention.

FIG. 2 is a simplified 3-D diagram illustrating components of an electricity generation device according to one embodiment of the present invention. As illustrated, a flywheel 201 that is coupled to an input gear 203 that is attached to a lever 205. The flywheel spins as the user rotate the lever 207. As depicted in the A-A zoom-in diagram, a permanent magnetic film 209 is coupled to the flywheel and is at a close distance 211 to a planar coil 213 on another substrate 215. As the permanent magnetic film moves over the planar coil stores, electricity 217 is generated via electromagnetic effect.

Figure 3A:
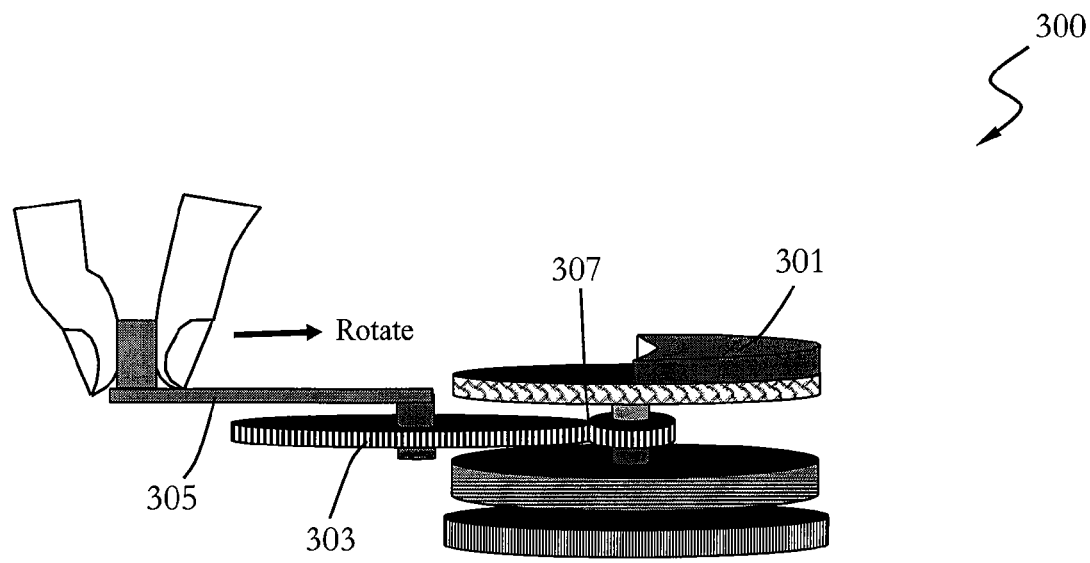
FIGS. 3A and 3B are simplified 3-D diagrams illustrating components of a power generation device according to one embodiment of the present invention.
Figure 3B:
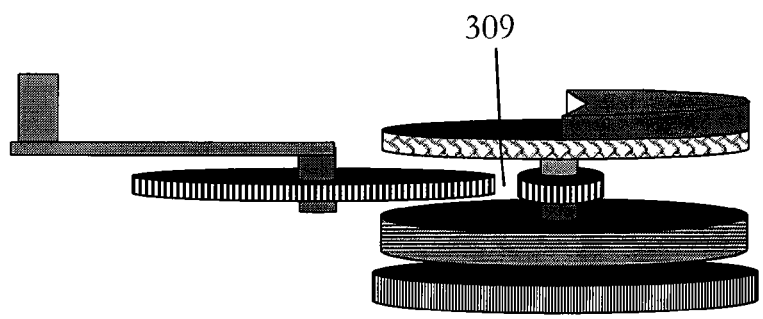

FIGS. 3A and 3B are simplified 3-D diagrams illustrating components of a power generation device according to one embodiment of the present invention. As illustrated in FIG. 3A, an asymmetric flywheel 301 is coupled to an input gear 303 that is attached to a lever 305. The input gear and flywheel gear are engaged 307 as the user rotates the lever, and the flywheel spins and electricity is generated as a result.

As depicted FIG. 3B, when there is no direct user manual input, the input gear and the flywheel gear are disengaged 309. The flywheel is an unbalanced pivoted mass that rotates with inertial forces from physical accelerations by user's movement and gravitational forces, similar to a self-winding mechanism automatic watch. AC electricity is generated as a result of the flywheel's movement.

Figure 4:
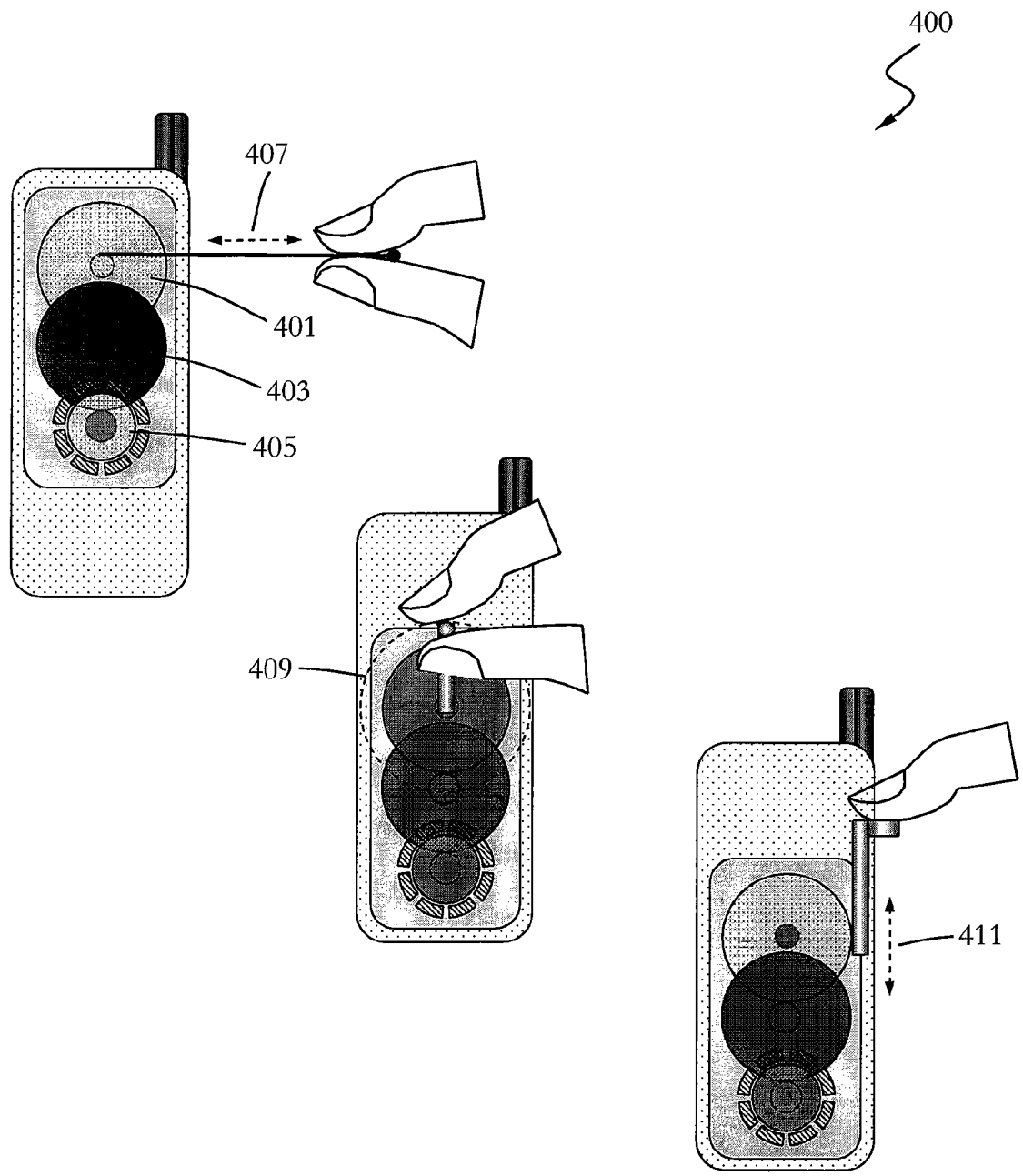
FIG. 4 shows simplified diagrams illustrating apparatus of a power generation device embedded in a mobile phone according to one embodiment of the present invention.

FIG. 4 shows simplified diagrams illustrating apparatus of a power generation device embedded in a mobile phone according to one embodiment of the present invention. As illustrated, the integrated generator is embedded in a mobile phone with three main components: gear train 401, flywheel 403, and the micro generator 405. According to one embodiment of the present invention, kinetic energy is input by a user by pulling a string back and forth 407. In another embodiment of the present invention, kinetic energy is input by a user by rotating a level in circle motion 409. Yet in another embodiment of the present invention, kinetic energy is input by a user by pressing a knob in up-down motion 411.

Figure 5:
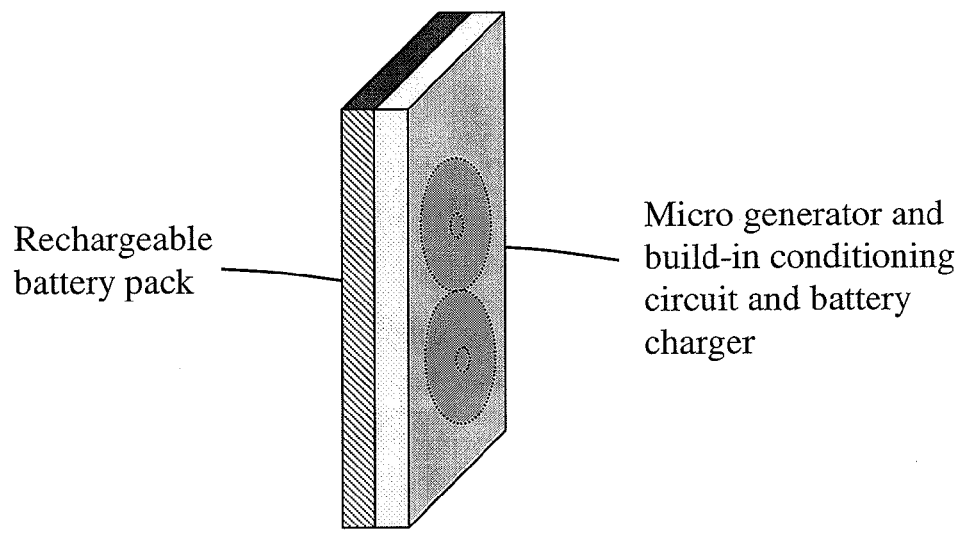
FIG. 5 is a simplified 3-D diagram illustrating the components of an integrated power generation device and rechargeable battery device according to one embodiment of the present invention.

FIG. 5 is a simplified 3-D diagram illustrating the components of an integrated power generation device and rechargeable battery device according to one embodiment of the present invention. As illustrated, a generator described above is attached to a rechargeable battery device in a full integrated package. The generated electricity is conditioned by the built-in conditioning circuit and is to charge the rechargeable battery through a built-in battery charger.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A portable electric generator apparatus comprising:
    an electro-magnetic electric generator member comprising a first terminal, a second terminal, a symmetric flywheel rotatably coupled to a shaft, a substrate disposed at a close distance from a first side of the symmetric flywheel, an asymmetric flywheel rotatably coupled to the shaft on the second side of the symmetric flywheel, and a first gear disposed between the symmetric flywheel and the asymmetric flywheel;
    a kinetic energy generating member comprising an input flywheel with a second gear, the kinetic energy generating member being configured to receive motion energy from an external source, the second gear being configured to engage the first gear; and
    a storage device having a positive terminal and a negative terminal, the positive terminal being coupled to the first terminal; and the negative terminal being coupled to the second terminal;
    wherein the storage device is a capacitor and/or a battery.

2. The apparatus of claim 1 further comprising a housing, the housing enclosing the electro-magnetic electric generator member, the kinetic energy generating member, and the storage device.

3. The apparatus of claim 1 wherein the input flywheel, is coupled to a drive member for converting the motion energy into rotation of the input flywheel.

4. The apparatus of claim 3 wherein the drive member comprises a rotating crank device, the rotating crank device being operable to move by a human user.

5. The apparatus of claim 3 wherein the drive member comprises a pull member, the pull member being operable to move in a first direction by a human user.

6. The apparatus of claim 3 wherein the drive member comprises a level member, the level member being operable to move in one or more directions by a human user.

7. The apparatus of claim 3 wherein the second gear of the input flywheel can be shifted from a disengaging position to an engaging position with the first gear to transfer the rotation of the input flywheel to rotation of the symmetric flywheel and the asymmetric flywheel.

8. The apparatus of claim 7 wherein the symmetric flywheel comprises one or more magnetic regions at the first side, the substrate comprises an electric coil member, wherein the rotation of the symmetric flywheel moves the one or more magnetic regions against the electric coil member at the close distance, inducing an electric current on one or more portions of the electric coil member.

9. The apparatus of claim 8 wherein the electric coil member is characterized by a planar structure.

10. The apparatus of claim 8 wherein the one or more magnetic regions comprises one or more films of magnetic material.

11. The apparatus of claim 8 wherein the one or more magnetic regions comprises one or more discrete magnetic devices.

12. The apparatus of claim 8 wherein the electric current is provided to conditioning device via the first terminal and the second terminal, the conditioning device converting the electric current to electric charges stored in the storage device between the positive terminal and the negative terminal.

13. The apparatus of claim 7 wherein the asymmetric flywheel comprises an unbalanced pivoted mass configured to cause further rotation of the symmetric flywheel after the second gear is shifted back to the disengaging position from the engaging position.

* * * * *